United States Patent [19]

Bashaw

[11] Patent Number: 4,625,312

[45] Date of Patent: Nov. 25, 1986

[54] TEST AND MAINTENANCE METHOD AND APPARATUS FOR INVESTIGATION OF INTERMITTENT FAULTS IN A DATA PROCESSING SYSTEM

[75] Inventor: Lawrence D. Bashaw, Phoenix, Ariz.

[73] Assignee: Honeywell Information Systems Inc., Phoenix, Ariz.

[21] Appl. No.: 830,903

[22] Filed: Feb. 18, 1986

Related U.S. Application Data

[63] Continuation of Ser. No. 539,358, Oct. 6, 1983, abandoned.

[51] Int. Cl.$^4$ .............................................. G06F 11/04
[52] U.S. Cl. .......................................... 371/16; 371/29
[58] Field of Search .................. 364/200, 900; 371/16, 371/29, 20, 13, 12, 11, 7.8, 9

[56] References Cited

U.S. PATENT DOCUMENTS

| | | | |
|---|---|---|---|
| 3,905,023 | 9/1975 | Perpiglia | 364/200 |
| 3,988,579 | 10/1976 | Bottard et al. | 371/16 |
| 4,025,767 | 5/1977 | Bottard | 377/16 |
| 4,045,661 | 8/1977 | Antoine et al. | 371/12 |
| 4,062,061 | 12/1977 | Batchelor et al. | 371/29 |
| 4,194,113 | 3/1980 | Fulks et al. | 371/20 |
| 4,360,915 | 11/1982 | Sindelar | 371/13 |
| 4,394,763 | 7/1983 | Nagano et al. | 371/13 |
| 4,438,494 | 3/1984 | Budde | 364/200 |
| 4,477,901 | 10/1984 | Brabard et al. | 371/15 |
| 4,503,535 | 3/1985 | Budde | 364/200 |
| 4,506,362 | 3/1985 | Morley | 371/13 |

*Primary Examiner*—Michael R. Fleming
*Attorney, Agent, or Firm*—A. A. Sapelli; J. S. Solakian; A. Medved

[57] ABSTRACT

A test and maintenance system for use with a data processing system comprising a specialized circuit set wherein the circuit set registers can be configured into a serial array, a clock signal distribution system capable of delivering controlled clock signals to selected serial arrays, a maintenance data processor for providing predetermined signal groups, and addressing apparatus responsive to the predetermined signal groups for loading and unloading register arrays in response to the predetermined signals. The disclosed apparatus permits a predetermined signal group to be entered into the serial register array, a predetermined number of clock cycles (i.e. series of operations performed on the data), and the resulting signals shifted from the serial register array and signals applies to data processing unit for display of analysis. By comparing the expected result for a given initial state with the actual result of an operation sequence, the accuracy of the operation of a data processing system, or any portion thereof, can be established. The test and maintenance apparatus can be used to investigate intermittent errors by systematic repetition of a procedure producing the error. For example, fault produced by a failing or marginal component can be distinguished from a fault produced by a mechanical problem. The test and maintenance apparatus can also provide for localization of the intermittent fault through access to all of the register cells.

4 Claims, 13 Drawing Figures

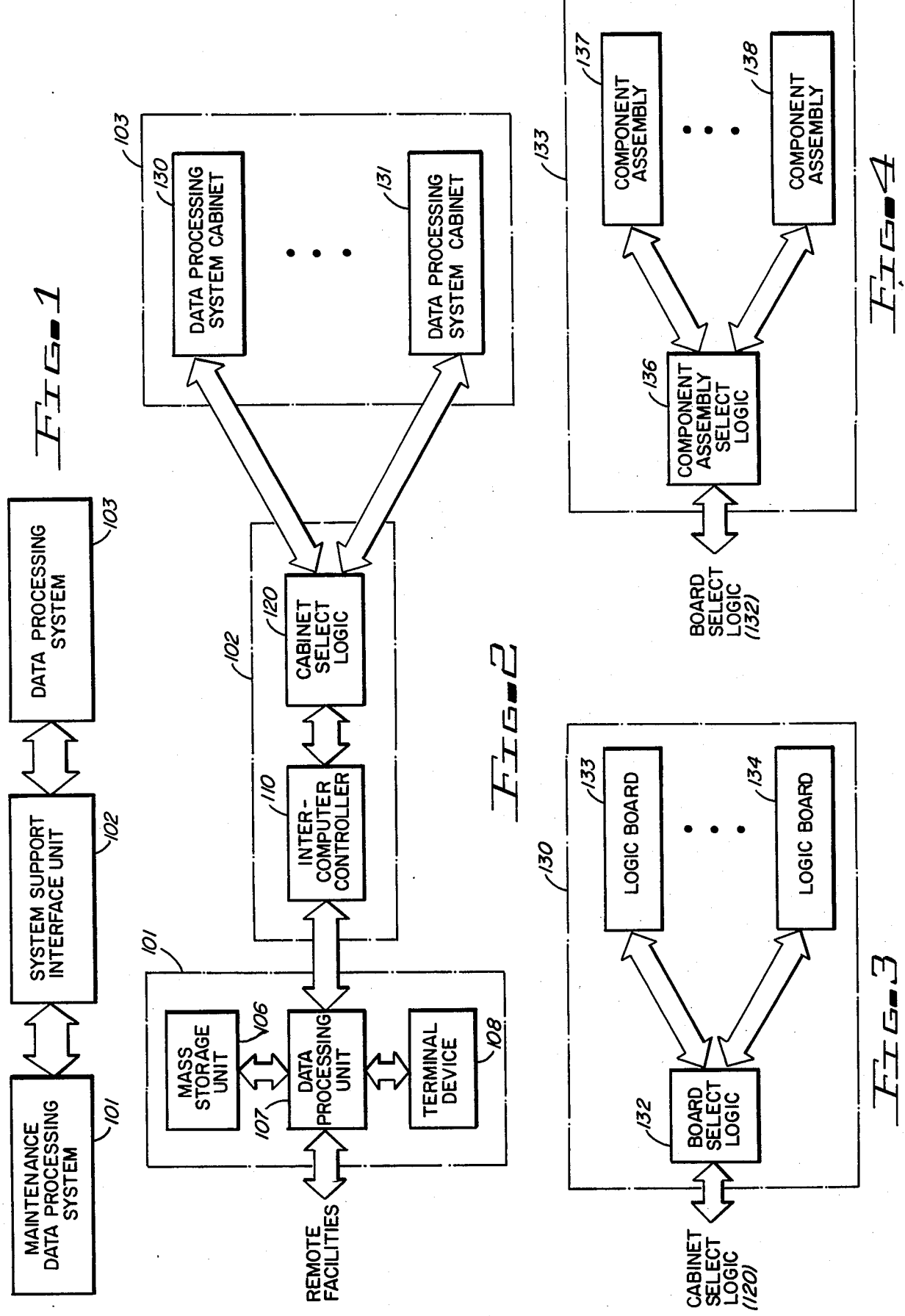

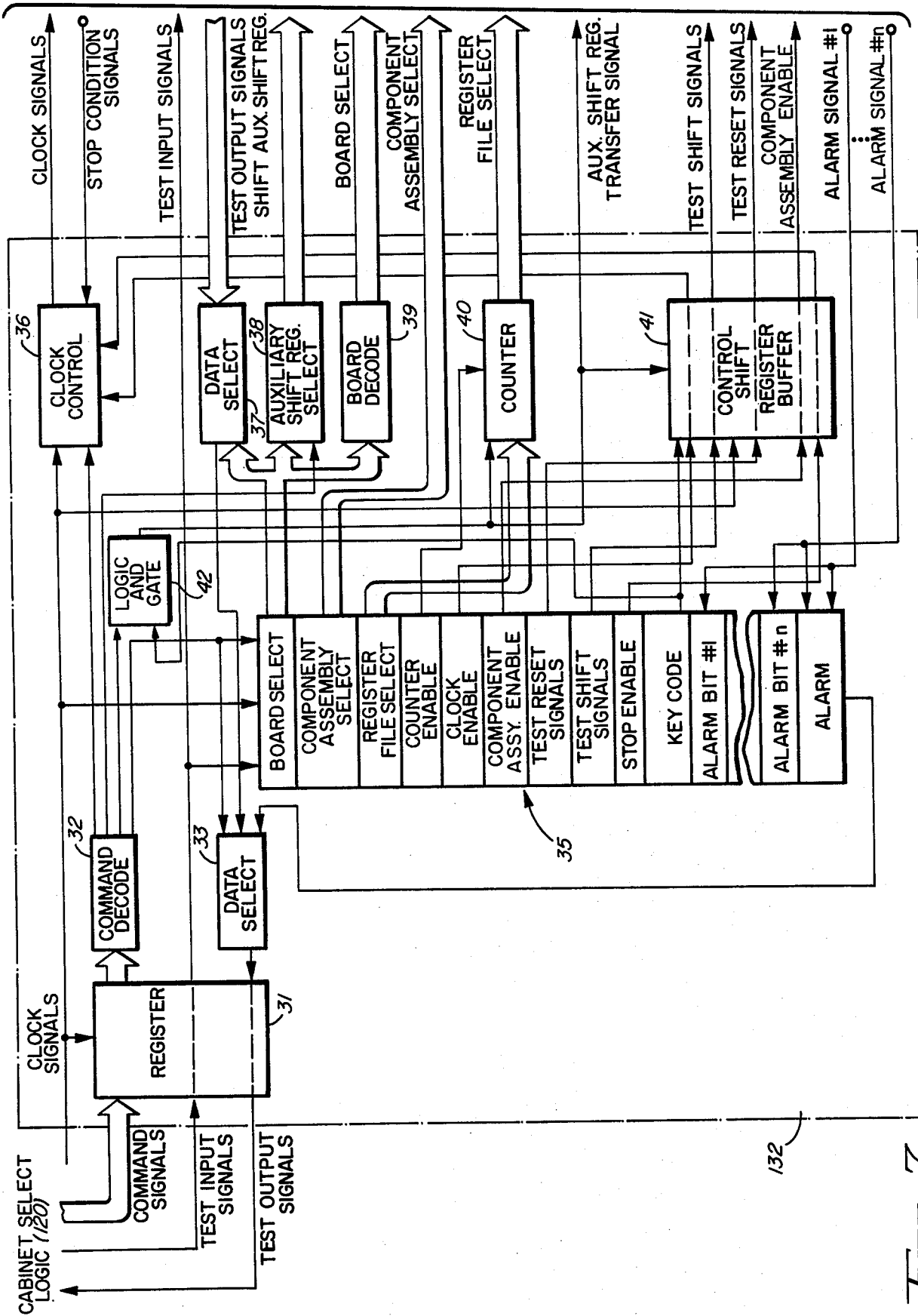

TEST AND MAINTENANCE METHOD AND APPARATUS FOR INVESTIGATION OF INTERMITTENT FAULTS IN A DATA PROCESSING SYSTEM

This is a continuation-in-part of co-pending application Ser. No. 539,358 filed on Oct. 6,1983, now abandoned. cl BACKGROUND OF THE INVENTION 1. Field of the Invention This invention relates generally to data processing systems and more particularly to apparatus and method for maintenance and for verification of the accuracy of the operation of data processing systems. With the disclosed apparatus, the data processing system can be initialized to any arbitrary predetermined state, a selected sequence of operation can be executed, and the resulting state of the data processing system can be determined. This apparatus permits investigation of intermittent faults in the data processing system.

2. Description of the Related Art

The detection and correction of intermittent faults is one of the most frustrating tasks associated with the data processing system. Because of the transient nature of the fault, precise information becomes difficult to acquire. The problem of the detection and correction of intermittent faults is further complicated by the fact that at least two sources of faults can exist. On the other hand, the origin of the fault can be with a failing or marginal electronic component. On the other hand, an intermittent fault can be associated with a mechanical problem, such as a transmission member that periodical opens and prevents transfer of signals. In the related art, the correction of an intermittent fault typically required instruction because little was available in apparatus to assist in investigation. The instant invention brings apparatus and procedure to bear permitting investigation of the fault condition.

SUMMARY OF THE INVENTION

It is an object of the present invention to provide an improved test and maintenance apparatus for a data processing system.

It is another object of the present invention to provide test and maintenance apparatus capable of investigating intermittent faults in a data processing system.

It is yet another object of the present invention to provide test and maintenance apparatus capable of entering predetermined signals in each of the register positions of a data processing system, executing preselected programs a multiplicity of times, and investigating the results of each program execution.

It is a further object of the present invention to provide test and maintenance apparatus capable of controlling the clock and data signals stored in a data processing system so that operation of the data processing system can be controlled and programs directed toward testing of localized areas of the data processing system.

It is a still further object of the present invention to provide test and maintenance apparatus capable of entering predetermined signals in the registers of a data processing system, performing pre-established operations by the data processing system, and analyzing the resulting signals of the data processing system and repeating the procedure to determine the nature of the intermittent fault.

The aforementioned and other objects of the present invention are obtained by a maintenance processor capable of applying predetermined signal groups, registers in the data processing system capable of being configured into a serial array in response to the maintenance processor signals, interface circuits capable of addressing and shifting logic signals into and out of the serial register arrays and a clock signal distribution system responsive to the maintenance processor signals capable of controlling the clock signals applied to each component.

This apparatus can be used to enter pre-established logic signals in a portion or into all of the cells of a register. Because the clock signals are controllable, the data processing unit can perform a predetermined operation or sequence of operations on the pre-established signals. The contents of the registers resulting from the operation(s) can then be withdrawn from the registers in order to verify the accuracy of the signal manipulation by the data processing system.

The apparatus is used to execute a series of programs until a program producing the error condition is identified. This program repeats and the results are collected in a manner to display characteristics of the fault condition. In particular, a mechanical fault can be distinguished from a fault from a marginal or failing element.

These and other features of the invention will be clear upon reading of the specification along with the figures.

BRIEF DESCRIPTION OF THE DRAWINGS

FIG. 1 is a block diagram of a data processing system and associated test and maintenance apparatus according to the present invention.

FIG. 2 is a block diagram of a data processing system elements and associated test and maintenance apparatus elements.

FIG. 3 is a block diagram of the elements of a data processing system cabinet according to the present invention.

FIG. 4 is a block diagram of the elements of a logic board according to the present invention.

FIG. 7 is a block diagram of the board select logic used by the test and maintenance apparatus.

DETAILED DESCRIPTION OF THE FIGURES

Figure 5:
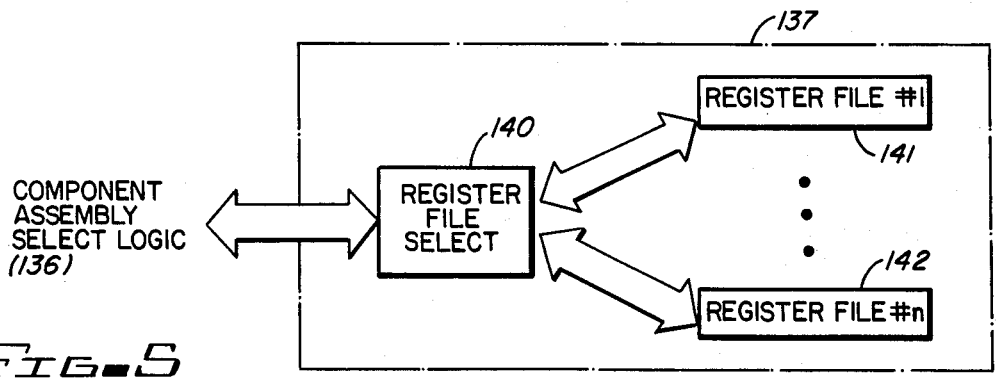
FIG. 5 is a block diagram of a portion of the elements of a component assembly used by the test and maintenance apparatus.

Referring first to FIG. 1, the maintenance data processing system 101 exchanges signals with the system support interface unit 102. The system support interface unit 102, in turn, exchanges signals with the data processing system 103.

Referring next to FIG. 2, the maintenance data processing system 101 comprises a mass memory storage unit 106 coupled to a data processing unit 107. The data processing unit 107 is also coupled to remote facilities, terminal device 108, and to the system support interface unit 102, and more specifically to the inter-computer controller 110. The system support interface unit 102 also includes cabinet select logic 120 which is coupled to the inter-computer controller 110. The data processing system 103 is divided into a plurality of data processing system cabinets 130 through 131 and each of the data processing system cabinets are coupled to the cabinet select logic 120.

Referring to FIG. 3, the data processing system cabinets 130 through 131 each include board select logic 132 and logic boards 133 through 134. The board select logic 132 is coupled to the cabinet select logic 120 of the system support interface unit 102.

Referring to FIG. 4, the logic boards 133 through 134 are comprised of a component assembly select logic 136, which is coupled to the board select logic 132 and a plurality of component assemblies 137 through 138. The component assembly select logic 136 is coupled to the component assemblies 137 through 138.

Referring to FIG. 5, each component assembly 137 through 138 having registers with a plurality of files is comprised of register select logic 140 associated with each register memory files and a plurality of associated register file #1 141 through register file 142. The register file select logic 140 is coupled to the register file #1 141 through register file #n 142 and to the component assembly select logic 136.

Figure 6:
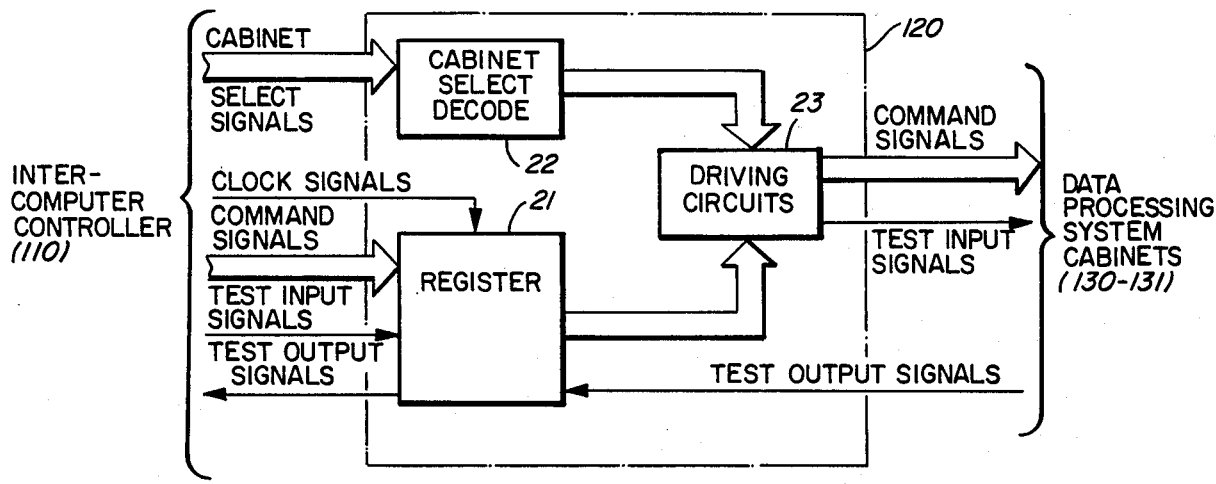
FIG. 6 is a block diagram of the elements of the cabinet select logic according to the present invention.

Referring next to FIG. 6, the cabinet select logic 120 is comprised of cabinet select decode apparatus 22, driving circuits 23, and register 21. The cabinet select decode apparatus 22 receives cabinet select signals from the inter-computer controller 110. The output of the cabinet select decode apparatus 22 is coupled to the driving circuits 23. Register 21 receives clock signals, command signals and test input signals from the inter-computer controller 110. Register 21 also supplies test output signals to the inter-computer controller. Register 21 provides command signals and test input signals to driving circuits 23 and register 21 receives test output signals from the data processing system cabinets 130 through 131. The driving circuits 23 supply command and test input signals to the data processing system cabinets 130 through 131.

Referring next to FIG. 7, a detailed block diagram of the board select logic 132 is shown. The board select logic 132 is comprised of register 31, command decode logic circuits 32, data select logic 33, control shift register 35, clock control 36, data select logic 37, auxiliary shift register select logic 38, board decode logic 39, counter circuit 40, and control shift register buffer 41. Register 31 receives command signals, clock signals, and test input signals from the cabinet select logic 120 and provides test output signals to the cabinet select logic 120. The test input signals includes signals for storage in the auxiliary shift register. Similarly, the test output signals includes signals for the auxiliary shift register output and the alarm apparatus. The specific signal group transferred over by these electrical coupling members is controlled by the data processing unit 107. Register 31 applies command signals to command decode logic 32, which in turn, applies signals to control shift register 35, to clock control 36, to data select logic 33, to an input terminal of logic AND gate 42, and to auxiliary shift register select logic 38. Register 31 applies test input signals to control shift register 35 and the logic boards 133 through 134, and register 31 receives test output signals from data select logic 33. Data select logic 33 receives signals from an alarm signal position (i.e. the most significant bit) of the control shift register 35 and from data select logic 37. The control shift register 35 applies signals from a board select portion of the register to the board decode logic 39, to the auxiliary shift register select 38, and to data select logic 37. Control shift register 35 applies signals from a register file select portion of register 35 and from and a control enable portion of register 35 to counter 40. Signals from a clock enable portion of the control shift register 35, component assembly enable portion of register 35, a test reset signal portion of register 35, a test shift signal portion of register 35, and a stop enable portion of register 35 are applied to shift control register buffer 41. Clock control logic 36 receives system clock signals, receives clock control signls from command decode logic 32, receives signals from control shift register buffer 41, and receives stop condition signals from the cabinet logic. Clock control logic 36 applies clock signals to the logic boards. Data select logic 37 receives test output signals from the logic boards. Board decode logic 39 applies board select signals to the logic boards. Counter 40 applies register file select signals to the logic boards while control shift register buffer 41 applies component assembly enable signals, test reset signals and test shift signals to the logic boards. The component assembly select portion of the control shift register applies component assembly select signals to the logic board. The test output signals from each of the component assemblies is also applied to a related alarm bit position of the control shift register 35 and all of the signals are applied to an alarm (most significant bit) position of the control shift register. The control shift register 35 includes a plurality of register positions which serve the function of a key code. These register positions are coupled to a second input terminal of logic AND gate 42. An output terminal of logic AND gate 42 is coupled to counter 40, to the auxiliary shift registers (i.e. providing transfer signals) and to control shift register buffer 41.

Figure 8:
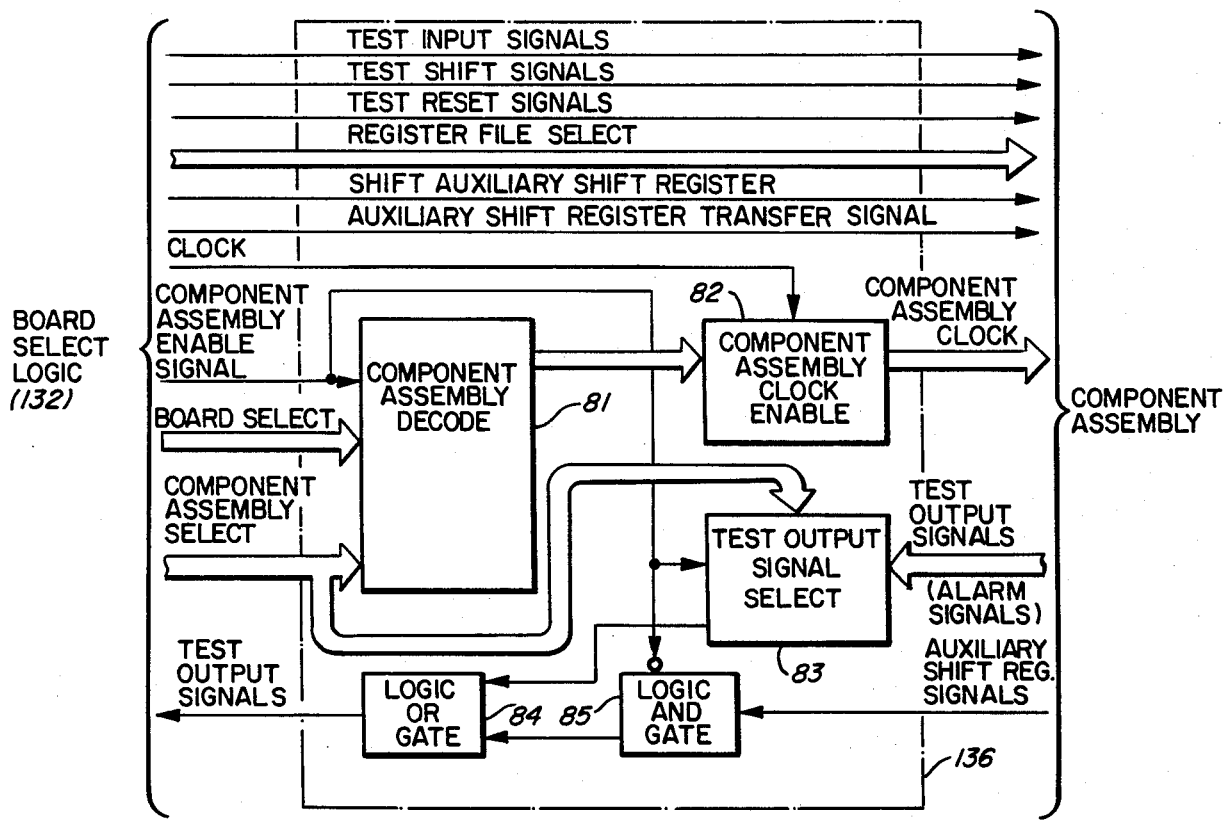
FIG. 8 is a block diagram of the component assembly select logic used by the test and maintenance apparatus.

Referring to FIG. 8, the component assembly select logic 136 is shown. The test reset signals, the test shift signals, the register file select signals, the auxiliary shift register transfer signal and the shift auxiliary shift register signals are received from board select logic 132 and applied to the component assemblies. Component assembly decode logic 81 receives component assembly enable signals, board select signals and component assembly select signals. Component assembly clock logic 81 applies signals to the component clock enable logic 82. Component assembly clock enable logic 82 also receives clock control signals, and this logic applies signals to the component assembly clock apparatus. Test output signal select logic 83 receives component assembly select signals, test output signals, and component assembly enable signals and applies signals to logic OR gate 84. Logic OR gate 84 receives signals from logic AND gate 85 and from test output signal select logic 83 and applies test output signals to board select logic 132. Logic AND gate 85 receives inverted component assembly enable logic signals and auxiliary shift register output signals from the component assemblies.

Figure 9:
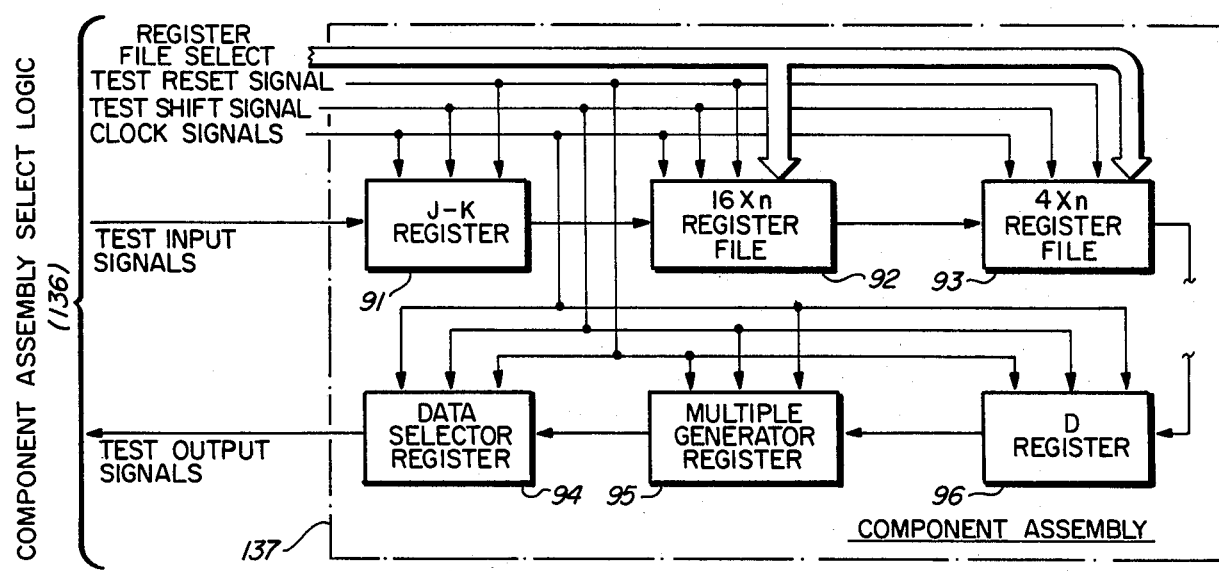
FIG. 9 is a block diagram of a portion of an exemplary component assembly according to the instant invention.

Referring next to FIG. 9, a block diagram of a partial configuration of the registers for an exemplary component assembly is shown. The component assembly is comprised of J-K register 91, 16×n register file 92, 4×n register file 93, D register 96, multiple generator register 95 and data selector register 94. Applied to each register are test reset signals, test shift signals and clock signals. For those register elements that include a plurality of register files, register file select signals are also applied. The registers are arranged sequentially so that test input signals are applied to the arbitrarily assigned first register of the sequence, (i.e. J-K register 91 in FIG. 9) and the test output signals are received from the last register of the component assembly (i.e. data selector register 94). All of the other registers and register elements can be coupled sequentially in the component. As will be clear, only the test connections for the registers are shown. The connections for the normal operation of the data processing system and the multiplicity of elements between the register cells are not shown.

Figure 10:
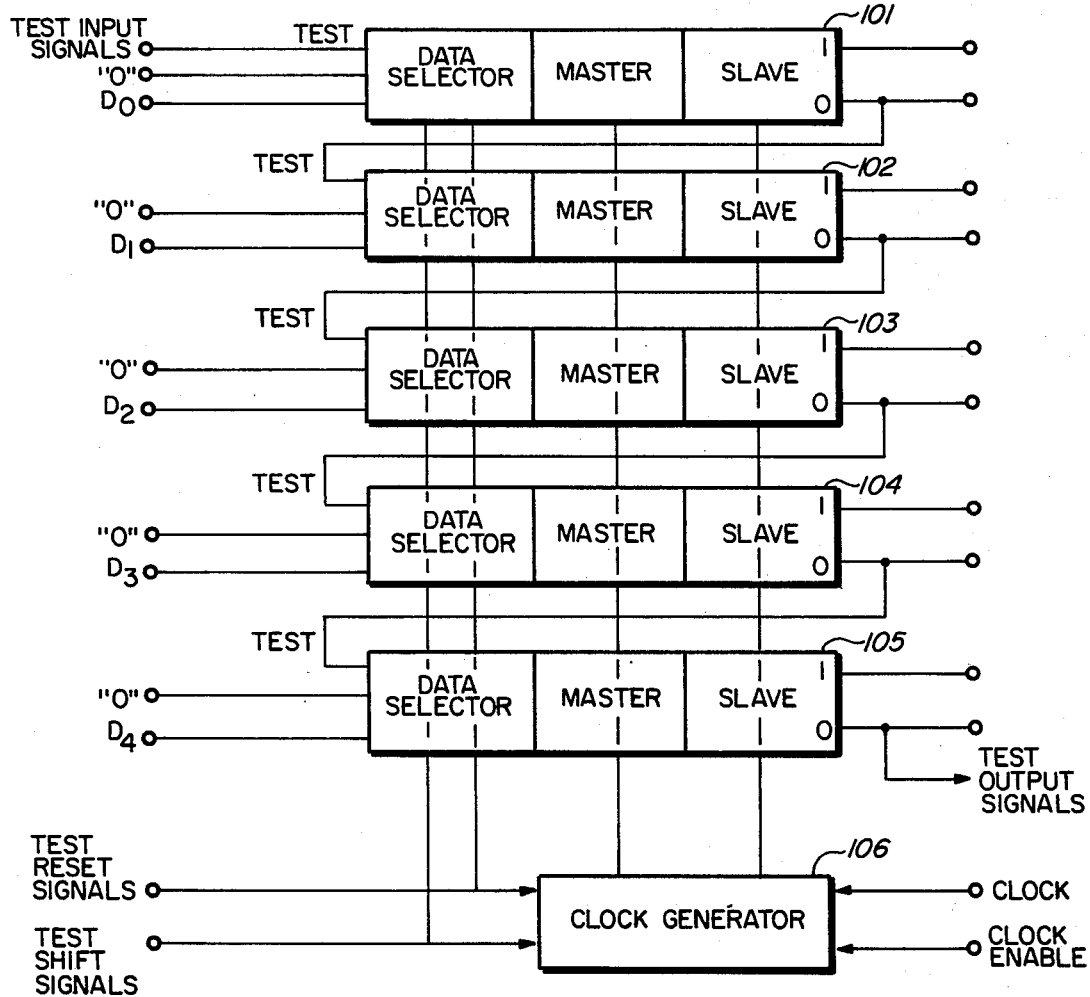
FIG. 10 is a block diagram of an exemplary "D" register of the type capable of use with the present invention.

Referring to FIG. 10, a typical D register, according to the present invention is shown. The D register is comprised of register elements 101 through 105 and clock generator logic 106. Each register element includes a data selector portion, a master portion coupled to the data selector portion and a slave portion coupled to the master portion. Each data select portion has three input terminals, a logic "0" signal terminal, a "D" data terminal and test terminal. The data selector selects one signal input mode based on the test reset and test shift signals applied to the data selection portion of the register elements. The slave portion of each register element has a signal output terminal and an inverted signal output terminal. The inverted output signal terminals are coupled to the test terminal of the data selector of the succeeding register element. The inverter output signal terminal of the last register element provides test output signals, while the test input terminal of the first register element receives test input signals. The clock enable logic 106 receives test reset signals, test set signals, clock signals and clock enable signals. The clock enable logic has a first terminal coupled to all of the master portions of the register elements and a second terminal coupled to all of the slave portions of the register elements.

Figure 11:
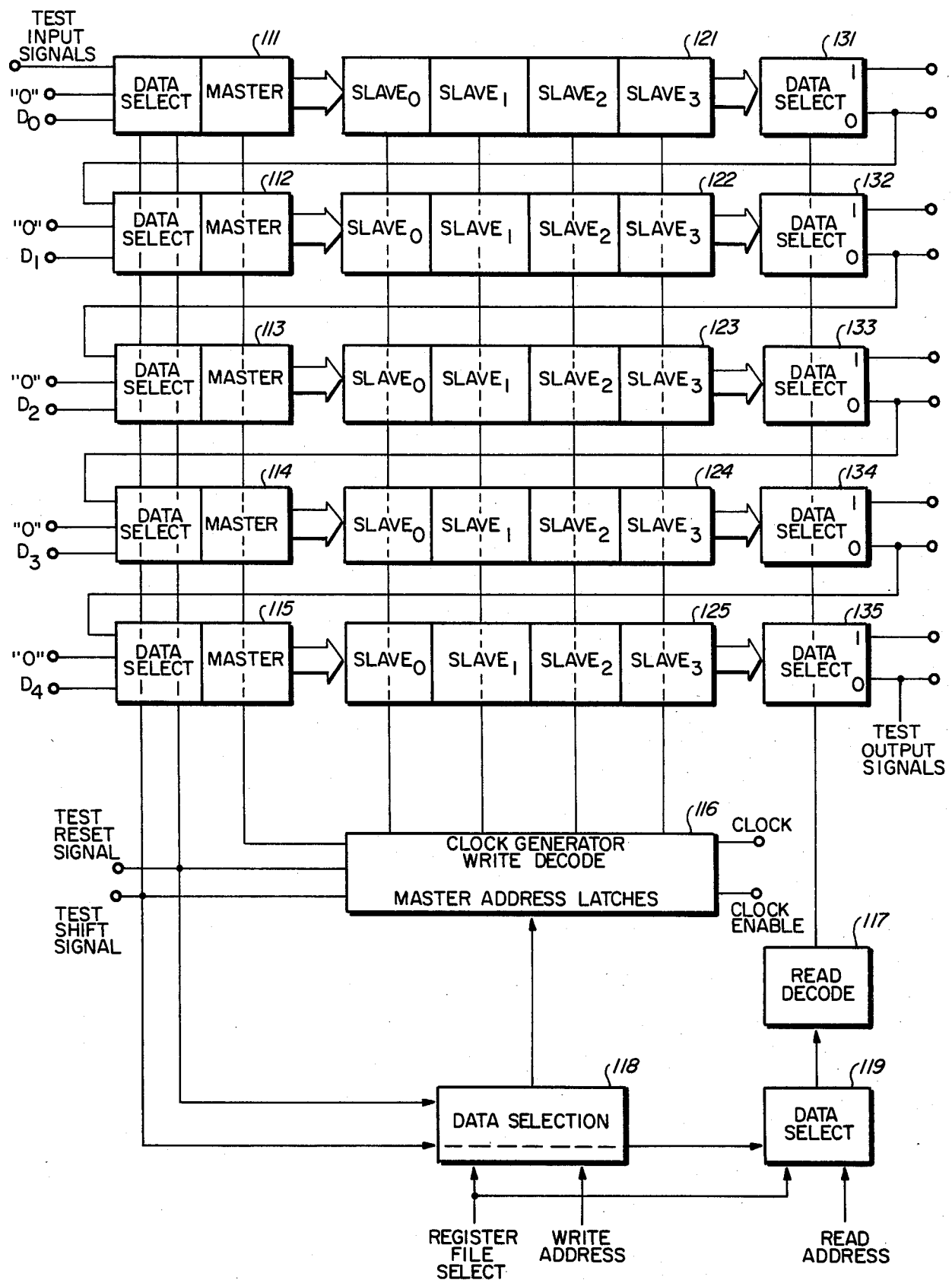
FIG. 11 is a block diagram of an exemplary 4×5 "D" register file of the type capable of use with the present invention.

Referring to FIG. 11, a typical 4×5 D input register file according to the present invention is shown. The register includes five groups of elements, clock generator, write decode and master address latch logic 116, a data selector 118, a read decode logic 117 and data selector 119. Each register element group includes a data selector portion and master portion (111-115), a slave portion with four positions (121-125) and a data select portion (131-135). The data select portions of register elements 111-115 have input terminals for test signals, for "0" signals and for data i.e. "$D_o$"-"$D_4$" signals. The data select portion is coupled to the master portion of the registers. The register master portions 111-115 are coupled to the four-position slave portions 121-125 respectively. The four-position slave portions 121-125 are coupled to data select portions 131-135 respectively. Each data select portion has two output terminals, a signal output terminal and an inverted signal output terminal. The inverted signal output terminal of each register element is coupled to the succeeding test input signal terminal of data select input terminals, i.e. the inverted logic signal position of data select 131 is coupled to the data input terminal of data select 112.

The test signal terminal of register portion 111 is coupled to the test input signals, while the inverted logic signal output terminal of data selector 135 provides the test output signals. Test reset signals and test shift signals are applied to the input data select register portions 111-115, to clock generator, write address decode, master address latches logic 116, data select logic 118 and data select logic 119. Data select logic 118 also receives register file select signals and write address signals. Data select 119 also receives register file select signals and read address signals and applies signals to read decode logic 117. Read decode logic applies signals to data (word) select logic portions 131-135 of the registers. Clock generator, write address and master address latches logic 116 also receive clock signals, clock enable signals, and signals from data select logic 118 and applies signals to each master portion of elements 111-115 and applies signals to each of the slave positions in register slave portions 121-124.

Figure 12:
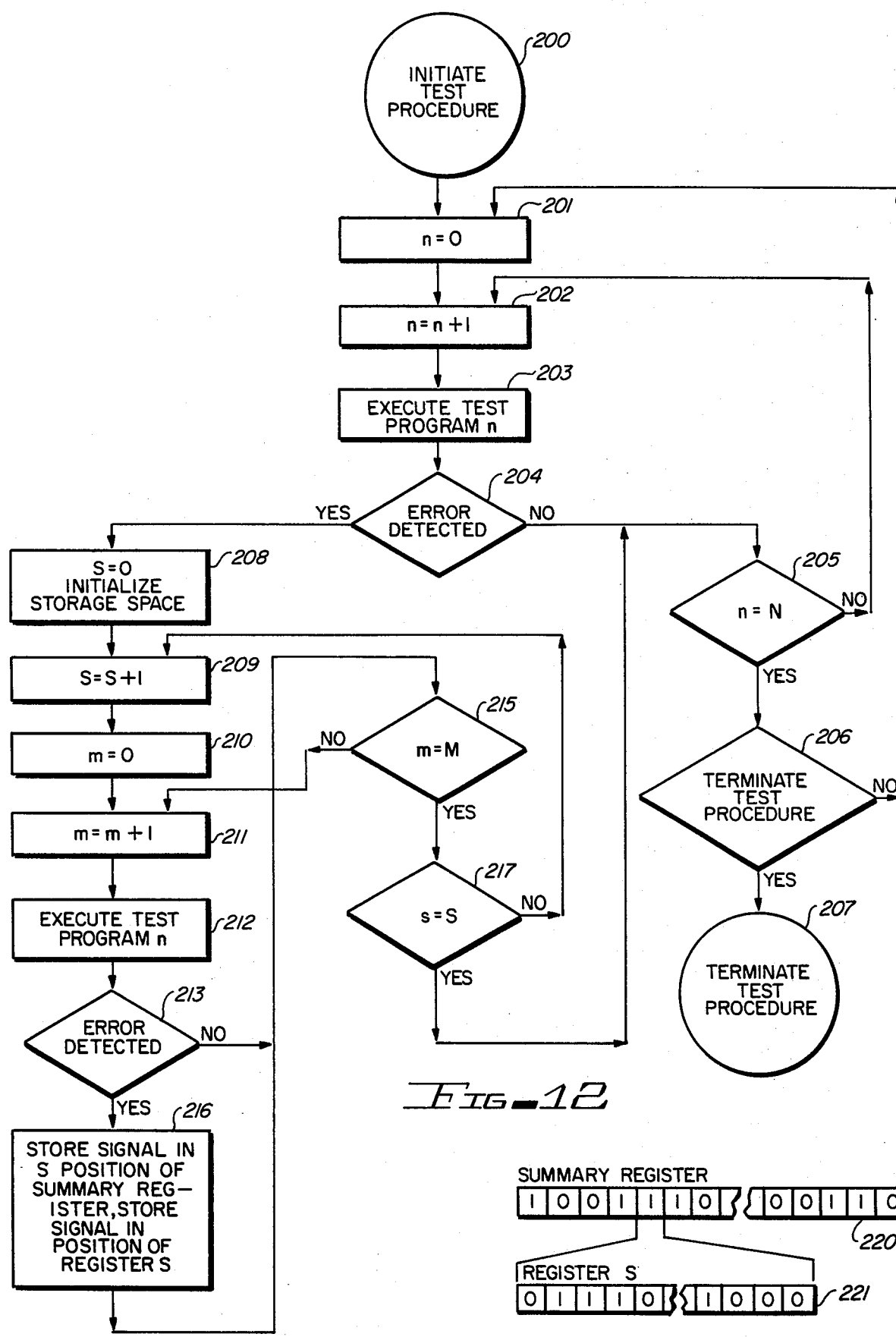
FIG. 12 is a flow diagram indicating how the apparatus can be utilized to investigate an intermittent fault.

Referring to FIG. 12, the process of obtaining information describing an intermittent fault is shown. The process begins symbolically with step 200 which is a representation that the appropriate programs are being extracted from mass memory and execution of the program can begin. Step 201, executed by the program, initializes parameter n and step 202 increments the parameter n one unit. Step 203 executes one of a sequence of test programs identified by the parameter n. Step 204 determines if the execution of test program n produced an error. If step 204 did not produce an error, then the parameter n is tested in step 205 to determine if all (i.e. N) of the test programs have been executed. If all the individual test programs have not been executed, then the parameter n is incremented in step 202 providing a program loop until all programs have executed. In step 205, if all of the individual test programs have been run, (i.e. n=N), then step 206 determines if the entire test sequence is to be terminated in step 207.

If an error is detected in step 204, then a second parameter, s, is initialized in step 208 and incremented by one unit in step 209. A third parameter, m, is initialized in step 210 and incremented by one unit in step 211. In step 212, test program n is executed. Step 213 determines if an error has been detected as a result of the program execution. If an error is not detected, then the parameter m is compared with a value M. In step 215, if m≠M, then the m is incremented in step 213 and the process is continued. If an error is detected in 213, then an indicia of the error is stored in the mth position of the sth storage cell and an indicia is stored in the sth position of a summary register in step 216. If m=M in step 215, then step 217 tests if s is equal to the quantity S. If s≠S, s is incremented in step 209 and the process is continued. If s=S in step 217, then the process checks, in step 215, if n=N. If not the procedure can continue with all the sequence of programs. However, it is possible to exit from the procedure in step 217 when s=Sd, a procedure not shown in FIG. 12. It will also be clear that FIG. 12 provides for a search for an intermittent error when a location is not known. When the approximate location is identified, the appropriate program (n) can be used without the requirement to search through a group of programs.

Figure 13:
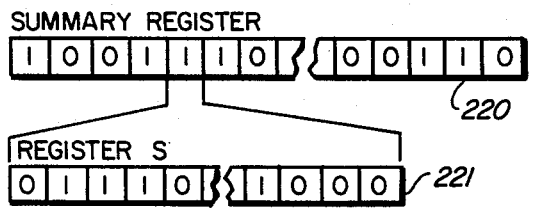
FIG. 13 is an illustration of the contents of registers storing the results of a multiplicity of program executions of a program exercising the intermittent faults.

Referring to FIG. 13, the registers holding the indicia developed by the process of FIG. 12 as shown. The summary register consists of s positions. Associated with each position of the summary register is an error register consisting of m position. As a result of the process described by FIG. 12, whenever an error is detected in test program n after the initial error, a logic signal is placed in the corresponding position of the error register 302 as an indicia of the occurrence of an error. In addition, an error in a position of the error register results in a logic signal being stored in the corresponding position of the summary register.

OPERATION OF THE PREFERRED EMBODIMENT

The test and maintenance system of the invention involves four categories of components. The maintenance components, together with appropriate storage devices and terminal devices, executes routines necessary to interface with the test and maintenance system and provide the programs to initialize the state of the data processing systems to determine the state of test apparatus at an arbitrary point in the operation of the data processing system and to provide specialized test capability. In the preferred embodiment, this portion of the system is also coupled to remote control and data processing facilities thereby permitting the maintenance and diagnostic processes to be performed remotely from the data processing system.

The intercomputer controller couples the maintenance computer and the test apparatus of the data processing system. The intercomputer controller contains registers for serialization and deserialization of data as well as programmable counters to facilitate the data conversion.

The system test apparatus consists of the apparatus between the intercomputer controller and the register or register files of the component assemblies that can be initialized and unloaded. The system test apparatus is closely integrated with the distribution of clock signals. The test system of the instant invention utilizes clocking for the apparatus that can be stopped or started and restricted to the target component under control of the test program. The system test apparatus provides for target clock addressing down to the component assembly level.

The fourth group of apparatus is the custom circuit family associated with the component assemblies. The register design in the preferred embodiment are edge-triggered master/slave register implementation. These registers include data select logic before the master latch that can select normal input data, configure the register as a shifting apparatus or reset the register by placing logic "0" states in the register positions The embedded data selector is also used to provide register personalization, i.e., D registers, J-K registers, multiple generator registers, etc. The data shifted during testing is inverted between each bit and can be used with the reset logic to pinpoint path failures. With respect to the register files, these files are edge-triggered and contain master latches for both data and write address input signals and also contain an array of slave registers. the register files also include an embedded data selector selecting normal data input signal mode, a mode permitting a selected file or file position sequence as a shifting apparatus and a mode providing a reset for entering logic "0's" in the register positions. Embedded data selectors are also used to provide register file input personalization. The shift configuration provides for inversion between each bit and can be used to identify shift path failures. An embedded data selector is also used before the write address master latches and before the read address decode logic apparatus. These data selectors can be used to insert an alternate test address wherein the in test shift or test reset modes allow the signals at a particular register address to be reset to logic "0" states or inserted into the shift path.

The operation of the test and maintenance system of the instant invention can be understood in the following manner. The system allows the loading and the unloading of all the registers and register files including the auxiliary shift register and the control shift register 35. Thus, any arbitrary initial state can be imposed on the apparatus of the data processing system by shifting predetermined signals into the registers and register files of the data processing system and, thereupon, proceeds with normal operation. Similarly, the present state of the data processing system can be determined by shifting the resident logic signals out of the registers and register files into the maintenance computer for analysis. While the data is being shifted, each logic signal is inverted between each serial bit position so that, when used in conjunction with the synchronous reset of the register and register files, errors in the shift path can be identified.

The test system of the preferred embodiment can allow the following modes of operation shown in Table 1 by loading address and control shift signals into the control shift register.

TABLE I—MODES OF OPERATION OF THE TEST SYSTEM

1. Reset target apparatus.
2. Reset cabinet apparatus.
3. Enable clock signals to target apparatus.
4. Enable clock signals to cabinet apparatus.
5. Shift target apparatus signals into the maintenance data processing system for display and/or alteration.
6. Enable clock signals to cabinet apparatus until an alarm is detected (error condition or maintenance stop an address and/or data). This mode requires an auxiliary shift register load.
7. Transmit alarm signal to maintenance data processing system.

In the preferred embodiment, the component assemblies are implemented by micropacks, each micropack having a plurality of elements. Each board has a multiplicity of micropacks associated therewith, and provides a logical entity for purposes of test signal and clock signal distribution. Similarly, a plurality of boards is associated with each cabinet of the processing system and provides a logical entity for distribution of test signals and clock signals to the associated boards. It will be clear that a different hierarchy of signal distribution will be possible without departing from the scope of the invention.

Referring again to FIG. 9, a block diagram of devices included in a micropack for the test and maintenance apparatus is shown. Except for the clock signal distribution which is also necessary for the normal data processing operation, the signals shown as being applied to the devices of the component assembly are those utilized for the test and maintenance procedures. The test shift signals cause the register signals to be shifted in a serial manner by the clock signals. The component assembly enable signal provides that only the designated component assembly will have clock signals applied thereto. Referring to FIG. 10, the test terminals of the data selectors are coupled to the inverse signal output terminal of the preceeding slave element and test input signals can be clocked by clock generator logic 106 in a serial fashion through each register array and become the test output signals i.e. of slave 105 inverse signal terminals. The test reset signals cause the data select logic to activate the "0" terminal thereby providing a mechanism for initializing the register (i.e. placing a logic "0" in each register position).

In order to save the amount of interconnections and to minimize the addressing apparatus, a plurality of registers, typically a majority of the registers in a component assembly, are coupled serially. Thus all registers 91-96 are serially coupled, but signals are transferred along the serial path only in the test and maintenance mode, i.e. by application of a test shift signal, component assembly enable signals and clock signals. It will be clear that the signals shifted into the registers are available for use in the normal operation of the data processing system.

In the preferred embodiment, many of the registers are in fact register files with a plurality of cells at each register position. The register file select signals (of FIG. 9) select the file to be addressed in the test and maintenance mode. Referring to FIG. 11, the register file select signals are applied to data select logic 118 and, when the test shift signal is present, to the clock generator, write decode, master address latches 116 and through data select 119 to read decode 117. The register file select signals provides for the function that data from the master is applied to the designated one of the four slave cells, and that the data from that slave cell is applied to the data select logic (i.e. 131-135) on a clock signal. The test shift signal provides that the test terminal of data select 111-115 has been activated and because of the coupling from the output data select logic (i.e. 131-135) of each register position, test input signals will be shifted through the register at the chosen slave cell. Similarly, the test reset signals are controlled by the register file select signals. It will be clear that the register file select signal can be manipulated so that the particular slave cell addressed can be altered with each clock cycle by altering counter 40, thereby providing a convenient mechanism of addressing the files of a register.

The test input signals are distributed to the components via the cabinet select 120 and board select logic 132 circuits. Referring to the cabinet select logic 120 of FIG. 6, the test input signals are a series of binary signals capable of providing the initial condition for the selected serial register mode of the component assembly and applied along a single signal path. The cabinet select signals (i.e. address signals) and the command signals can be applied along a plurality of signal paths. Upon selection of the cabinet, signals are transferred to board select logic 132 of the selected cabinet as shown in FIG. 7. The test input signals are applied to all the component assemblies via register 31, while component assembly select signals determine to which component assembly the test input signals will be entered. The board select signals, component select signals and register file select signals are imbedded in the test input signals along with mode control and other signals. The test input signals that are applied to the registers of the component assembly in the serial test mode after test input signals have been shifted into the control shift register 35, that include address and control signals. In order to increase the reliability of the test and maintenance apparatus, each group of test input signals entered in the control shift register 35 includes a plurality of preselected logic signals at preselected positions. If this preselected code is not present in the control shift register, then data can not be entered into either the auxiliary shift registers, counter 40 or control shift register buffer 41. This mechanism limits the amount of unreliable data entered into the register of the component assembly. The alarm signals share the test output signal coupling members when the serial register shifting is not occurring and are applied to the maintenance data processing unit 101 as part of the test output signals to indicate the presence of a preselected conditions. A cell is available in the control shift register 35 for each logic board. In addition, activation of any alarm cell will activate the most significatnnt position of the control shift register (and a signal is passed to the maintenance data processing unit 101) upon identification of an alarm cell for any board. By shifting the shift control register 35 contents to the maintenance data processing unit 101, the particular board producing the alarm signal can be identified. Similarly, the test output signals, i.e. signals stored in the registers of the component assembly in a serial mode are transferred, under control of the maintenance data processing system 101, through test output signal select logic 83, register 31 and register 21 to the maintenance data processing system 101.

Important to the operation of the invention is the distribution of the clock or timing signals as a processing system utility, similar to the distribution of power from the power supply. The clock signal apparatus has associated therewith logic to permit the distribution of the clock signals to be controlled by the maintenance data processing system 101. The maintenance data processing system can thereby control the shifting of the test input signals and the test output signals in the individual components. In addition, because the component assembly clock signals can be controlled, the actual operation of the component assemblies can be controlled. Similarly, the test input signals receive distribution throughout the data processing system. However, only the signal-designated boards and/or component assemblies will actually have the register signals shifted in the serial mode.

Referring to FIG. 7 and FIG. 8, apparatus for transferring signals in an auxiliary shift register is indicted. The auxiliary shift register is a group of register cells that store status information and/or control information. As an example of status information, a register cell can store the detection of a parity error. As an example of control information, a register can store a series of signals which when detected by apparatus of the component assembly, can result in a specified response, e.g. a branching operation. In each component assembly, these types of registers, in addition to the normal operational coupling of the data processing mechanism, are coupled in a serial manner. In this serial register, signals can be shifted into or out of the auxiliary shift register while the component assembly is engaged in normal operation. Expressed in a different way, the auxiliary shift register provides for the individual component, the functionality of apparatus normally associated with a maintenance computer. That is, the status of the component, especially error condition information, can be extracted and selected condition information can be entered in the component assembly. The auxiliary shift signals are transferred on the test input and test output signal connections. However, the register cells are shifted on the serial path only upon application of the shift auxiliary shift register signal. The cells of the auxiliary shift register are buffered from the normal component assembly register cells so that data can be transferred without affecting the normal operation of the data processing system. The signals are transferred from/to the normal component assembly register cells to/from the auxiliary shift register cells in response to the auxiliary shift register transfer signal.

Thus, for each component assembly, apparatus is available to shift signals into each register cell (i.e. test input signals), or to shift signals out of each register cell position (i.e. test output signals). The test input signals are determined by programs stored in the main memory storage unit 106 or applied by the terminal device and are entered under the control of the data processing unit 107. Similarly under control of the data processing unit, the test output signals can be withdrawn from the register cells and applied to the data processing unit 107. Thus, by addressing each component, the state of the registers for any aribitrary portion or from data processing system 103 can be established. Similarly, the state of any portion or of all of the registers can be determined by extracting the signals stored therein. Furthermore, because the clock is also under control of data processing unit 107, operation of the machine can be controlled. Thus, data processing system 103 can have an arbitrary state applied thereto after entering the appropriate test input signals, can provide any number of clock signals, and after applying the appropriate control signals can extract signals stored in the registers. The procedure can be utilized, where necessary, to analyze the operation of the data processing system in a step-by-step manner or a limited portion of the data processing system can be similarly tested.

The figures show the apparatus necessary to understand the test and maintenance apparatus. It is clear that coupled to the register cells of the data processing system are a multiplicity of logic and transmission components that are not shown. These logic and transmission components are the apparatus implementing data processing operations, but these components are not necessary for a description of the instant invention.

The investigation of intermittent faults by the present invention can be understood in the following manner. A sequence of test programs is developed that can exercise all of the data processing system. The sequence is continually cycled until an error is detected. The test program resulting in the error is then repeated M times for each position of the summary register (i.e. the summary register has S positions). Each error during the repeating of the test program n routine is recorded in the summary and error registers, so that the occurrence of the error as a function of time is stored. In the preferred embodiment M=1000 and S=1000 so that the test program n is executed 1,000,000 times.

The information from repeated program execution developed permits the nature of the error to be understood. For example, if the error is the result of a marginal or failing component, the occurrence of errors as a function of time should be relatively random. If however the errors are the result of a mechanical error, expected to be comparatively slow compared to test program execution, then the detected errors would be clustered in time. In addition, the occurrence of the error in test program n, knowing the area of data processing system influenced by the test program can help localize the problem. This localization can permit the execution of subroutines or more localized test programs in a similar manner to permit even greater localization. This ability to exercise localized programs is a result of the test and maintenance apparatus being able to load information into individul register cells and to extract information from the individual register cells.

The above description is included to illustrate the operation of the preferred embodiment and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. The method of investigating an intermittent fault in a data processing system having a plurality of component assemblies, said system including a maintenance processor for executing a plurality of test programs, each test program testing a given component assembly of the data processing system to detect the presence of a fault in the component so tested and for identifying the fault detected; said method comprising the steps of:
   a. executing the test programs sequentially until a given test program identifies that a fault is detected in a given component assembly;
   b. re-executing the test program which detected the fault in the given component assembly "T" times where "T" is an integer greater than zero;
   c. storing at the completion of each of the "T" re-executions of the test program of step b, each fault detected during each such re-execution of the program as a function of time.

2. The method of claim 1 in which "T" equals one million.

3. A method for investigating a fault in a data processing system consisting of a plurality of component assemblies and means for executing a plurality of test programs, each test program testing the operation of a given component assembly of the data processing system to determine the presence of a fault in the component assembly being tested, there being at least one test program for each component assembly, said method comprising the steps of;
   a. executing the test programs periodically until a given test program determines the presence of a fault in the operation of the component assembly being tested by that test program;
   b. re-executing the test program that has determined the presence of a fault up to a maximum of "T" times where "T" is an integer greater than zero;
   c. identifying each time its test program determines the presence of a fault in the operation of the tested component assembly during step b;
   d. associating each re-execution of said test program with a storage location and a storage device; and
   e. storing in the storage locations associated with each re-execution of a test program an indicia identifying the presence or absence of a fault in the operation of the component assembly during the re-executions of the test program associated with that location and the time the fault is identified.

4. The method of claim 3 in which "T" equals one million.

* * * * *